Feb. 2, 1926.

W. A. SMITH

AIR LINE LUBRICATOR

Filed March 17, 1925

1,571,495

INVENTOR.
William A. Smith
BY
HIS ATTORNEY

Patented Feb. 2, 1926.

1,571,495

UNITED STATES PATENT OFFICE.

WILLIAM A. SMITH, OF ATHENS, PENNSYLVANIA, ASSIGNOR TO INGERSOLL-RAND COMPANY, OF JERSEY CITY, NEW JERSEY, A CORPORATION OF NEW JERSEY.

AIR-LINE LUBRICATOR.

Application filed March 17, 1925. Serial No. 16,117.

*To all whom it may concern:*

Be it known that I, WILLIAM A. SMITH, a citizen of the United States, a resident of Athens, in the county of Bradford and State of Pennsylvania, have invented a certain Air-Line Lubricator, of which the following is a specification, accompanied by drawings.

This invention relates to oiling devices, but more particularly to devices which are attached to air lines for introducing oil into the air current utilized for actuating fluid actuated machines.

Usually, devices of this character are designed to supply lubricant in sufficient quantities to only one machine. This is due chiefly to the fact that they are not equipped with means for properly regulating the flow of oil in suitable quantities for varying requirements.

It is an object of this invention to automatically proportion the flow of oil into the pressure fluid utilized for actuating fluid actuated machines in order to insure uniform and efficient lubrication of the working parts of such machines.

Another object is to equip an air line lubricator with an automatic means for signalling when the oil in the reservoir reaches a certain predetermined level and when the reservoir should be refilled.

Other objects of the invention will be in part obvious and in part pointed out hereinafter.

Figure 1:
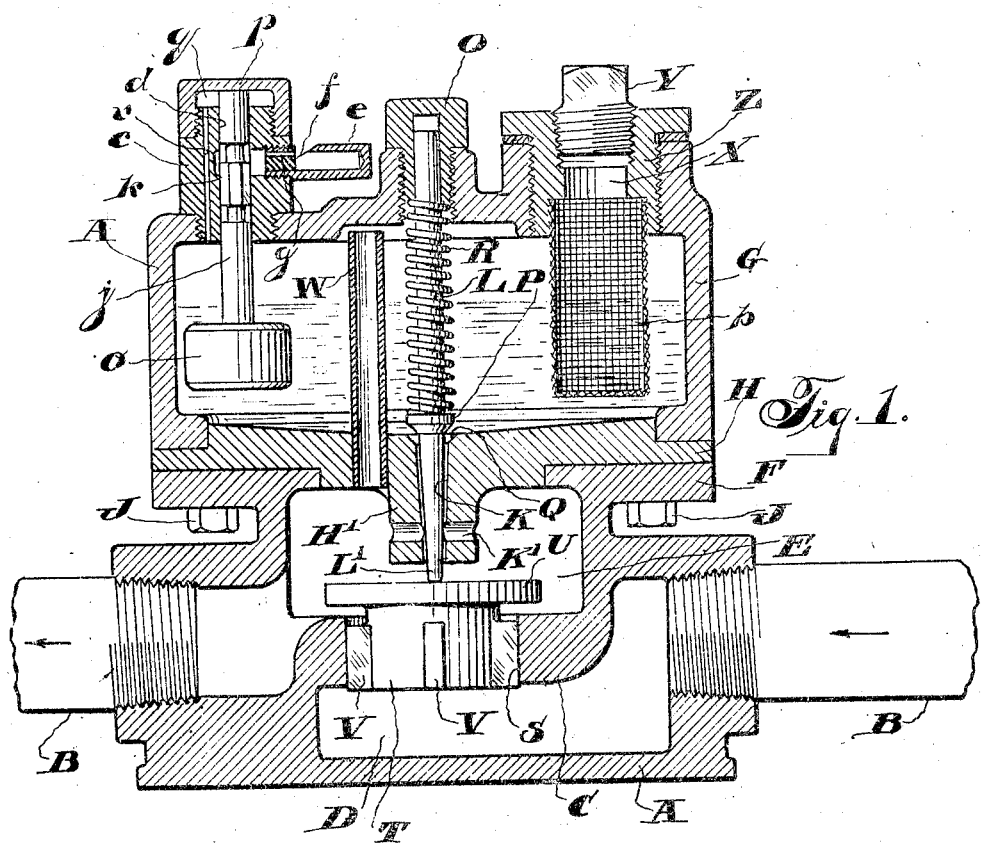
Figure 2:
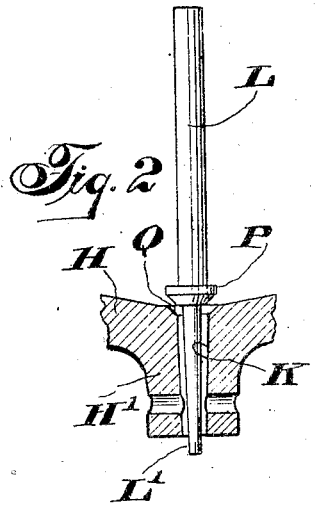

In the drawings forming part of the specification and in which similar reference characters refer to similar parts, Figure 1 is a longitudinal sectional view in elevation of an air line lubricator constructed in accordance with the practice of the invention, and Figure 2 is a vertical sectional view of a part of an air line lubricator showing a needle valve having a small tapered end suitable for controlling the flow of high viscosity oils.

Referring to the drawings, in which a preferred modification of the invention is illustrated, a casing A is shown connected to an air line B by means of convenient screw threads at opposite ends of the casing. A wall C divides the bore of the casing into chambers D and E and the chambers thus formed constitute a main passage for pressure fluid from the casing. A flange F is formed on one side of the casing and supports an oil reservoir G. In this instance a removable plate H serves as a bottom for the reservoir, and the plate H and the reservoir G are secured to the flange F by means of bolts J. The upper side of the plate H is preferably slightly concave so that the flow of oil will be directed toward a tapered aperture K formed in a projection H' of the plate H, and connects the reservoir with the chamber E of the casing. A transverse passage K' near the end of the projection H' intersects the aperture K and is preferably arranged in line with the direction of flow of the pressure fluid.

Suitable means are provided for controlling the flow of oil from the reservoir G into the air current flowing through the casing. To this end a needle valve L guided within a plug O is arranged to reciprocate within the aperture K. The valve L is provided with a head P which limits the downward movement of the valve and cooperates with a seat Q in the plate H for cutting off the flow of oil from the reservoir. The forward end L' of the valve is tapered to correspond with the taper of the aperture K and preferably extends in advance of the projection H' when the valve L rests on its seat. The tapered end L' may be like that shown in Figure 1 for light and medium grade oils, and for heavy oil the end L' may be reduced as illustrated in Figure 2. A compression spring R is arranged about the stem of the valve L and tends to hold the valve in closed position.

Disposed within a bore S of the wall C is a float valve T having a flange U at one end. A plurality of wings V are carried by the valve T and guide the valve within the bore S. In this instance, the valve T is positioned directly underneath the needle valve L and is preferably concentric therewith. A hollow tube W supported within the plate H extends through the reservoir G and is in communication with the chamber E to admit pressure fluid into the reservoir for creating pressure on the surface of the oil.

The oil is introduced into the reservoir through an opening X sealed by a suitable filler plug Y. In this instance, the opening X is formed in a screw threaded plug Z.

Supported by the plug Z is a screen *b* preferably of wire gauze which is arranged about the opening X to prevent the admission of foreign matter into the reservoir with the oil.

Suitable means are provided for warning the operator when the oil in the reservoir G reaches a low level, and for this purpose a plug *c* having a hollow bore *d* and screw threaded at its ends, is secured on top of the reservoir G. A hollow member *e* having an opening *f* in one side is screwed into the side of the plug *c*. In this instance the hollow member *e* is in communication with the bore *d* through a passage *g* formed through a disc in the inner end of the member *e*.

Disposed within the bore *d* of the plug *c* is a valve *j* having a reduced portion *k* near its outer end. The valve *j* is normally held in closed position by a float *o* secured to the inner end of the valve *j* and adapted to be submerged in the oil in the reservoir. In this instance a cap *p* is screwed to the upper end of the plug *c*, and in addition to serving as a stop for the valve *j* in one direction also forms a pressure chamber *q* between the end wall of the cap *p* and the outer end of the plug *c*. Pressure fluid is admitted into the chamber *q* through a passage *r* to balance the pressure against the bottom of the float *o*.

In operation, the device is attached to the air line B in such a manner that pressure fluid is adapted to enter the chamber D of the casing A, and thence through the bore S into the chamber E. The pressure fluid exerts pressure against the flange U of the valve T and raises said valve against the end of the needle valve L. As the valve T continues upwardly, the force of the spring R is overcome and the valve L is lifted from its seat, thus permitting oil to be drawn from the reservoir to the aperture K by the pressure fluid flowing through the chamber E. The oil thus drawn from the reservoir will intermingle with the pressure fluid and be carried thereby to the working parts of the machine.

The movement of the valves T and L is controlled by the volume of air passing through the bore S, so that if additional machines are attached to the line B to be supplied therefrom the valves are accordingly lifted to a higher point by the increased current volume thus permitting more oil to flow from the reservoir into the air current. On the other hand, if the air consumption, and consequently the current volume, are reduced, the valve will be lowered automatically and a less amount of oil is drawn from the reservoir. If the valve T is carried upwardly against the end of the projection H and covers the outer end of the aperture K, the oil may pass through the passage K' into the chamber E.

From the above description, it is obvious that the supply of oil into the pressure fluid is at all times proportionate to the amount of air consumed by the machines.

Whenever the oil in the reservoir is reduced to a predetermined level, the float *o* and the valve *j* will follow the oil level until the reduced portion *k* of the valve *j* is lowered sufficiently to admit pressure fluid into the bore *d*. The pressure fluid thus admitted will flow through the passage *g* into the hollow member *e* and cause a whistling sound thereby calling the operator's attention to the fact that the oil in the reservoir is at a low level. The sound thus produced will continue until the oil in the reservoir is replenished. In this way, the possibility of the machines running dry and causing undue wear on the working parts of the machine is eliminated.

The above described air line lubricator has been found to function in a very efficient manner and is applicable to a great variety of uses.

I claim:

1. An air line lubricator comprising an oil reservoir, a main pressure fluid passage, a spring pressed tapered valve for controlling the flow of oil from the oil reservoir to the main passage, and a float valve operated by pressure fluid for lifting the tapered valve to discharge oil from the main passage, and a tube within the lubricator for admitting pressure fluid from the main passage into the reservoir to create pressure above the surface of the oil for forcing the oil into the main passage.

2. An air line lubricator comprising an oil reservoir, a main pressure fluid passage, a valve for controlling the flow of oil from the reservoir to the main passage, automatic means for lifting said valve in one direction, means for signaling when the oil in the reservoir reaches a predetermined level, and a tube for admitting pressure fluid into the reservoir to create pressure above the surface of the oil for forcing the oil into the main passage and for operating the signaling means.

3. An air line lubricator comprising an oil reservoir, a main pressure fluid passage, a spring pressed tapered valve for controlling the flow of oil from the oil reservoir to the main passage, a float valve operated by pressure fluid for lifting the tapered valve to discharge oil from the main passage, automatic means for audibly signaling when the oil in the reservoir reaches a predetermined level, and a hollow tube for admitting pressure fluid from the main passage into the reservoir above the surface of the oil for forcing the oil from the reservoir into the main passage and for operating the signaling means.

4. An air line lubricator comprising an oil reservoir, a main pressure fluid passage, a tapered needle valve for controlling the flow of oil from the reservoir to the main passage, a spring to close the needle valve, a float valve operated by pressure fluid for opening the valve, a hollow plug forming a valve chamber associated with the reservoir, a whistle supported by the plug and in communication with the bore of said plug, a valve slidable within said plug, a float for holding the valve in normally closed position and for opening the valve when the oil in the reservoir reaches a predetermined level thereby permitting pressure fluid to flow into the whistle and cause a whistling sound, and a hollow tube for admitting pressure fluid into the reservoir above the surface of the oil for forcing the oil out of the reservoir into the main passage and for blowing the whistle.

5. An air line lubricator comprising an oil reservoir, a main pressure fluid passage, a vertically arranged spring pressed needle valve having a tapered forward end for controlling the flow of oil from the reservoir into the main passage, a float valve arranged in the main passage and actuated by pressure fluid for opening the needle valve, a hollow plug forming a valve chamber associated with the reservoir, a whistle screwed into the bore of said plug, a valve slidable within said plug, a float secured to the valve and controlled by the oil in the reservoir for holding the valve in normally closed position and opening the valve when the oil in the reservoir reaches a certain predetermined level thereby permitting pressure fluid to flow into the whistle and cause a whistling sound, and a tube for admitting pressure fluid from the main passage into the reservoir above the surface of the oil for creating pressure in the reservoir to force the oil into the main passage and for blowing the whistle.

In testimony whereof I have signed this specification.

WILLIAM A. SMITH.